(12) United States Patent
Segal et al.

(10) Patent No.: US 11,489,844 B2
(45) Date of Patent: Nov. 1, 2022

(54) ON-THE-FLY CREATION OF TRANSIENT LEAST PRIVILEGED ROLES FOR SERVERLESS FUNCTIONS

(71) Applicant: Twistlock Ltd., Herzliya (IL)

(72) Inventors: Ory Segal, Tel Aviv (IL); Yuri Shapira, Holon (IL); Avraham Shulman, Tel Aviv (IL); Benny Nissimov, Givatain (IL); Shaked Yosef Zin, Tel Aviv-Jaffa (IL)

(73) Assignee: Twistlock Ltd., Herzliya (IL)

( * ) Notice: Subject to any disclaimer, the term of this patent is extended or adjusted under 35 U.S.C. 154(b) by 153 days.

(21) Appl. No.: 16/852,215

(22) Filed: Apr. 17, 2020

(65) Prior Publication Data

US 2021/0329003 A1 Oct. 21, 2021

(51) Int. Cl.
*H04L 9/40* (2022.01)

(52) U.S. Cl.
CPC ............ *H04L 63/108* (2013.01); *H04L 63/08* (2013.01)

(58) Field of Classification Search
CPC ....... H04L 63/108; H04L 63/08; H04L 63/20; H04L 63/104
See application file for complete search history.

(56) References Cited

U.S. PATENT DOCUMENTS

| | | | | |
|---|---|---|---|---|
| 7,113,994 B1* | 9/2006 | Swift | ...................... | G06F 21/33 709/200 |
| 7,912,971 B1* | 3/2011 | Dunn | .................... | H04L 63/102 726/28 |
| 8,024,186 B1* | 9/2011 | De Bonet | ........... | H04L 65/4092 704/238 |
| 8,474,018 B2 | 6/2013 | Mardikar et al. | | |
| 10,255,422 B1* | 4/2019 | Last | ........................ | G06F 21/31 |
| 10,430,727 B1* | 10/2019 | Fusillo | ............... | G06Q 30/0269 |
| 10,649,861 B1* | 5/2020 | Natanzon | ............ | H04L 41/5025 |
| 10,671,443 B1* | 6/2020 | Ramachandran | ..... | G06F 16/903 |

(Continued)

OTHER PUBLICATIONS

Baldini, et al., "The Serverless Trilemma: Function Composition for Serverless Computing", Onward! The 2017 ACM SIGPLAN International Symposium on New Ideas, New Paradigms, and Reflections on programming and Software, Vancouver BC Canada, Oct. 25-27, 2017, pp. 89-103.

(Continued)

*Primary Examiner* — Aravind K Moorthy
(74) *Attorney, Agent, or Firm* — Gilliam IP PLLC (57) ABSTRACT

The disclosed serverless security access control system leverages static analysis information about application code and runtime information to create and assign on-the-fly transient serverless function roles. A default role can be initially assigned to serverless functions of the application. The default role allows the function to communicate with a security access broker. The access broker accesses least privilege information about an invoked serverless function and then creates and assigns a transient role to the serverless function based on that information. The short life of the role reduces and possibly eliminates the security risk of an over-permissive role. The access broker can update the least privilege information based on updated analysis of the application code and runtime information to allow flexibility and adaptation over executions.

17 Claims, 5 Drawing Sheets

(56) References Cited

U.S. PATENT DOCUMENTS

| | | | |
|---|---|---|---|
| 10,678,522 B1* | 6/2020 | Yerramreddy | G06F 8/10 |
| 10,715,542 B1* | 7/2020 | Wei | G06F 16/958 |
| 10,771,468 B1 | 9/2020 | Walker et al. | |
| 10,782,934 B1* | 9/2020 | Chawda | G06F 8/30 |
| 10,817,346 B1* | 10/2020 | Culp | G06F 9/5077 |
| 10,860,433 B1* | 12/2020 | Lieberman | G06F 16/907 |
| 10,896,060 B1* | 1/2021 | Sciarrino | G06F 11/3065 |
| 11,057,480 B1* | 7/2021 | Wells | H04L 67/51 |
| 11,144,513 B1* | 10/2021 | Padisetty | G06F 16/122 |
| 2004/0168082 A1* | 8/2004 | Foster | H04L 63/08 726/29 |
| 2005/0108678 A1* | 5/2005 | Goodwin | G06F 8/20 717/100 |
| 2006/0288404 A1* | 12/2006 | Kirshnan | H04L 41/026 726/5 |
| 2008/0127292 A1* | 5/2008 | Cooper | G06F 21/6281 718/1 |
| 2008/0313716 A1 | 12/2008 | Park | |
| 2009/0177721 A1* | 7/2009 | Mimatsu | H04L 67/1097 |
| 2009/0222894 A1 | 9/2009 | Kenny et al. | |
| 2009/0249063 A1* | 10/2009 | Sakurai | H04L 63/08 713/155 |
| 2011/0055918 A1* | 3/2011 | Keefe | G06F 21/6218 726/21 |
| 2011/0162046 A1 | 6/2011 | Forster et al. | |
| 2012/0060142 A1* | 3/2012 | Fliess | G06F 11/3457 717/102 |
| 2012/0102539 A1* | 4/2012 | Robb | G06F 21/6272 709/225 |
| 2012/0259877 A1* | 10/2012 | Raghunathan | G06F 21/6254 707/757 |
| 2012/0324540 A1* | 12/2012 | Wu | G06F 1/266 726/4 |
| 2013/0133024 A1* | 5/2013 | MacLeod | G06F 21/6218 726/1 |
| 2013/0219372 A1* | 8/2013 | Li | G06F 8/70 717/128 |
| 2014/0282889 A1* | 9/2014 | Ishaya | H04L 63/101 726/4 |
| 2014/0359692 A1 | 12/2014 | Chari et al. | |
| 2014/0359695 A1 | 12/2014 | Chari et al. | |
| 2015/0095968 A1* | 4/2015 | Steiner | G06F 21/62 726/1 |
| 2017/0295181 A1 | 10/2017 | Parimi et al. | |
| 2018/0113793 A1* | 4/2018 | Fink | G06F 11/362 |
| 2018/0115551 A1* | 4/2018 | Cole | H04L 63/083 |
| 2018/0121659 A1* | 5/2018 | Sawhney | G06F 21/566 |
| 2018/0173806 A1* | 6/2018 | Forstmann | G06F 9/448 |
| 2018/0227323 A1* | 8/2018 | Jevans | H04W 12/37 |
| 2018/0255102 A1* | 9/2018 | Ward | H04L 63/20 |
| 2018/0302277 A1* | 10/2018 | Shimamura | H04L 41/145 |
| 2019/0007458 A1* | 1/2019 | Shulman | H04L 63/1433 |
| 2019/0014171 A1* | 1/2019 | Stein | G06F 9/5027 |
| 2019/0028552 A1* | 1/2019 | Johnson, II | H04L 67/02 |
| 2019/0079744 A1* | 3/2019 | Bosch | G06F 8/60 |
| 2019/0140913 A1* | 5/2019 | Guim Bernat | G06N 3/105 |
| 2019/0188049 A1* | 6/2019 | Choudhary | G06F 8/425 |
| 2019/0205186 A1* | 7/2019 | Zhang | G06F 9/4843 |
| 2019/0332366 A1* | 10/2019 | Natanzon | G06F 11/3696 |
| 2019/0332781 A1* | 10/2019 | Natanzon | G06F 3/0619 |
| 2019/0334886 A1* | 10/2019 | Lelcuk | H04L 63/1466 |
| 2019/0334905 A1* | 10/2019 | Lelcuk | H04L 63/1458 |
| 2019/0384726 A1* | 12/2019 | Murphy | G06F 9/45558 |
| 2019/0384912 A1* | 12/2019 | Branson | G06F 21/566 |
| 2020/0012569 A1* | 1/2020 | Natanzon | G06F 16/2219 |
| 2020/0019471 A1* | 1/2020 | Natanzon | G06F 11/1469 |
| 2020/0026850 A1* | 1/2020 | Levin | G06N 20/00 |
| 2020/0026865 A1* | 1/2020 | Hulick, Jr. | G06F 21/604 |
| 2020/0089881 A1* | 3/2020 | Graun | G06F 21/565 |
| 2020/0120112 A1* | 4/2020 | Cybulski | H04L 63/102 |
| 2020/0175152 A1* | 6/2020 | Xu | G06F 21/14 |
| 2020/0195645 A1* | 6/2020 | Wei | H04L 9/3239 |
| 2020/0213279 A1* | 7/2020 | Xiong | H04L 45/54 |
| 2020/0213320 A1* | 7/2020 | Levin | G06F 9/5072 |
| 2020/0213338 A1* | 7/2020 | Lotem | G06N 20/00 |
| 2020/0213357 A1* | 7/2020 | Levin | H04L 41/0836 |
| 2020/0225724 A1* | 7/2020 | Macnamara | G06F 1/3296 |
| 2020/0226009 A1* | 7/2020 | Bachmutsky | G06F 12/10 |
| 2020/0241999 A1* | 7/2020 | Guim Bernat | G06F 11/3419 |
| 2020/0242237 A1* | 7/2020 | Simpson | G06F 21/54 |
| 2020/0244692 A1* | 7/2020 | Shua | G06F 11/301 |
| 2020/0250316 A1* | 8/2020 | Rickerd | G06F 9/44526 |
| 2020/0259865 A1* | 8/2020 | Raff | H04L 41/0806 |
| 2020/0267155 A1* | 8/2020 | Segal | H04L 9/0897 |
| 2020/0306643 A1* | 10/2020 | Borovikov | A63F 13/79 |
| 2020/0314168 A1* | 10/2020 | Nauerz | H04L 67/10 |
| 2020/0351345 A1* | 11/2020 | Bansod | G06F 11/1464 |
| 2020/0389401 A1* | 12/2020 | Enguehard | H04L 45/741 |
| 2021/0036921 A1* | 2/2021 | dos Santos Silva | H04L 41/0886 |
| 2021/0075908 A1* | 3/2021 | Murphy | H04L 61/106 |
| 2021/0099459 A1* | 4/2021 | Zhang | H04L 63/105 |
| 2021/0117217 A1* | 4/2021 | Croteau | G06F 11/3409 |
| 2021/0117558 A1* | 4/2021 | Robbins | G06F 21/604 |
| 2021/0126938 A1* | 4/2021 | Trost | G06F 21/552 |
| 2021/0141670 A1* | 5/2021 | Yassin | G06F 9/542 |
| 2021/0160271 A1* | 5/2021 | Garcarz | H04L 63/1433 |
| 2021/0184941 A1* | 6/2021 | Tootaghaj | H04L 41/16 |
| 2021/0192586 A1* | 6/2021 | Gomez | G06K 9/6221 |
| 2021/0200527 A1* | 7/2021 | Sanchez | G06F 11/1004 |
| 2021/0200596 A1* | 7/2021 | Sanchez | G06F 9/5038 |
| 2021/0233045 A1* | 7/2021 | Singh | G06Q 20/12 |
| 2021/0243209 A1* | 8/2021 | Ramani | H04L 63/105 |
| 2021/0294976 A1* | 9/2021 | Markarian | G06F 40/30 |
| 2021/0326458 A1* | 10/2021 | Watson | H04L 9/0819 |

OTHER PUBLICATIONS

Hall, et al., "An Execution Model for Serverless Functions at the Edge", IoTDI '19: International Conference on Internet of Things Design and Implementation, Montreal QC Canada, Apr. 15-18, 2019, pp. 225-236, retrieved on Apr. 17, 2020 from https://www.cc.gatech.edu/projects/up/publications/iotdi19-AdamHall.pdf.

U.S. Appl. No. 16/024,863, Advisory Action dated Nov. 17, 2020, 6 pages.

U.S. Appl. No. 16/024,863, Final Office Action, dated Sep. 4, 2020, 34 pages.

U.S. Appl. No. 16/024,863 Non-Final Office Action, dated Mar. 5, 2020, 19 pages.

U.S. Appl. No. 16/024,863, Non-Final Office Action dated Sep. 1, 2021, 33 pages.

U.S. Appl. No. 16/024,863, Final Office Action, dated Feb. 24, 2022, 32 pages.

* cited by examiner

ON-THE-FLY CREATION OF TRANSIENT LEAST PRIVILEGED ROLES FOR SERVERLESS FUNCTIONS

BACKGROUND

The disclosure generally relates to CPC class H04L and subclass 63/10.

A serverless architecture allows development of an application without the burden of managing underlying infrastructure. In terms of cloud computing, a cloud service provider provides Backend as a Service (BaaS) so that the application developer can focus on application development and not infrastructure management. The cloud service provider provisions, scales, and manages the infrastructure required to run application code.

With a serverless architecture, a serverless application can be developed. A serverless application is an application written with serverless functions to be run in stateless computer containers. The serverless functions are functions that are event-driven, ephemeral, and managed by the cloud service provider.

BRIEF DESCRIPTION OF THE DRAWINGS

Embodiments of the disclosure may be better understood by referencing the accompanying drawings.

DESCRIPTION

While the serverless paradigm has many advantages, the fine granularity of identity access and management (IAM) at a per-serverless function granularity can be problematic. This granularity of role assignment may allow for powerful security enforcement, but the complexity leads to developers assigning over-permissive roles to serverless functions. Over-permissive execution roles can be abused to perform unintended operations and allow security breaches.

The serverless security access control system disclosed herein facilitates adherence to the principles of least privilege and single responsibility. This serverless security access control system leverages static analysis information about application code and runtime information to create and assign on-the-fly transient serverless function roles. Instead of developers creating and assigning various roles to the serverless functions of a serverless application, a default role can be initially assigned to serverless functions of the application. The default role allows the function to communicate with a security access broker or access broker. The access broker accesses least privilege information about an invoked serverless function and then creates and assigns a transient role to the serverless function based on that information. The short life of the role reduces and possibly eliminates the security risk of an over-permissive role. The access broker can update the least privilege information based on updated analysis of the application code and runtime information to allow flexibility and adaptation over executions.

Figure 1:
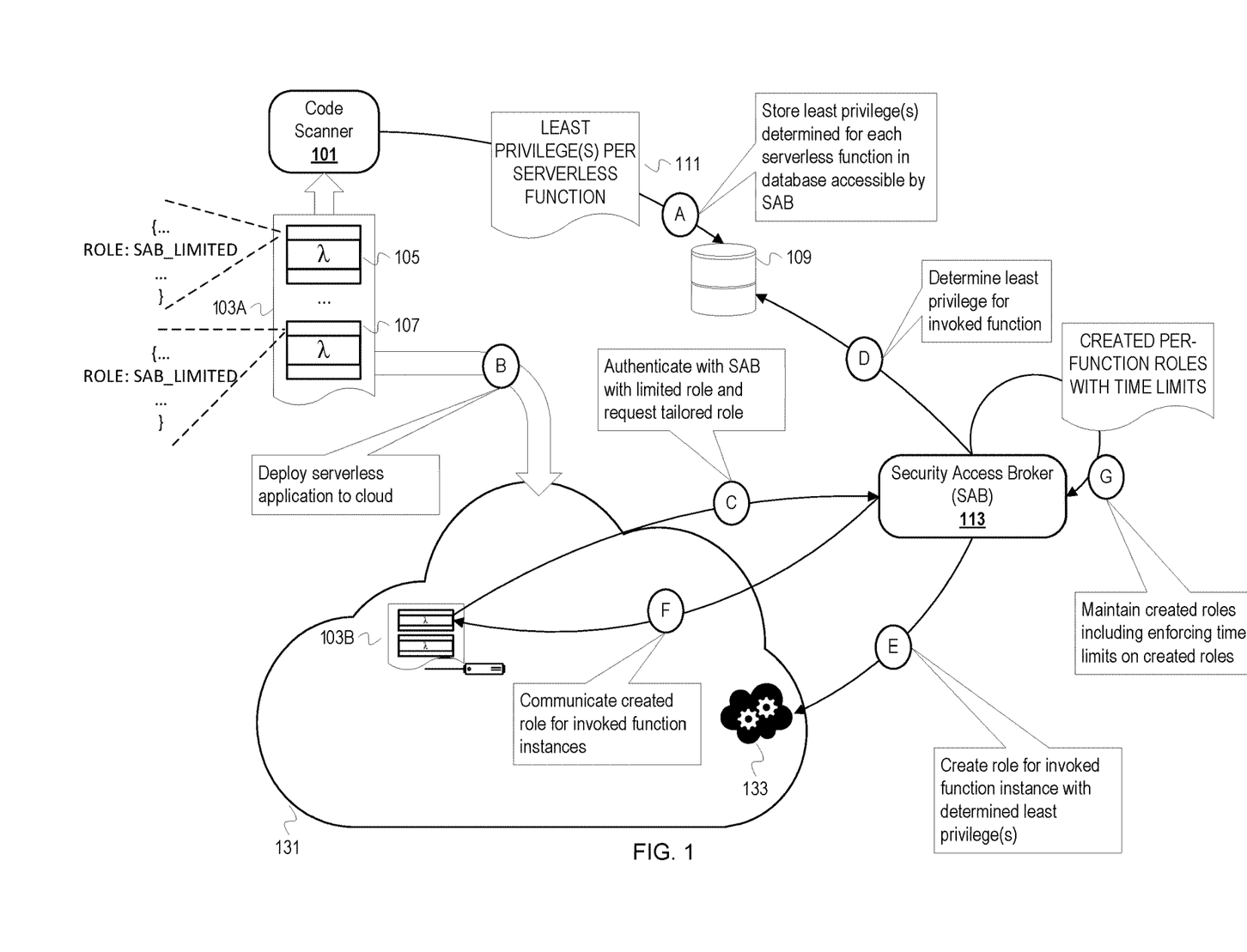
FIG. 1 is a conceptual diagram of a serverless application security access control system.

FIG. 1 is a conceptual diagram of a serverless application security access control system. A serverless application 103A has been developed with instrumented serverless functions (also referred to as anonymous functions or lambda functions) including instrumented serverless functions 105, 107. The serverless application 103A will be deployed to infrastructure 131 of a cloud service provider ("cloud infrastructure"). The deployed instance will be referred to as deployed serverless application 103B. A security access broker (SAB) 113 assigns roles to serverless function instances of the deployed serverless application 103B with resource access permissions ("privileges") that allow appropriate execution of serverless functions—least privileges to avoid abuse of over-permissive roles. The operations depicted in FIG. 1 for the example system are represented by a series of letters A-G. Although these stages are ordered for this example, the stages illustrate one example to aid in understanding this disclosure and should not be used to limit the claims. For instance, the stage G represents operations that can overlap operations represented by stages C-F in subsequent function invocations. Subject matter falling within the scope of the claims can vary with respect to the order and some of the operations.

At stage A, a code scanner 101 performs static analysis of the program code for the serverless application 103A. The code scanner 101 determines least privilege(s) information 111 (e.g., read access of a specific database) for each of the serverless functions 105, 107. The code scanner 101 provides this information 111 for storing into a database 109 that is accessible by the SAB 113. The code scanner 101 can be an application tool or service.

At stage B, the serverless application 103A is deployed to the cloud infrastructure 131. The cloud service provider corresponding to the cloud infrastructure 131 will provision resources for the deployed serverless application 103B.

During warm-up execution of the deployed serverless application 103B, runtime instrumentation on each of the serverless functions 105, 107 will execute to authenticate with the SAB 113 to obtain a tailored role for a corresponding serverless function at stage C. The instrumented serverless functions 105, 107 are programmed with a default role that constrains access to communicating with the SAB 113, as illustrated in FIG. 1 with the role name "SAB_LIMITED." The instrumented serverless functions 105, 107 will not be permitted to access any resource external to the serverless application 103B except the SAB 113. When the serverless function 105 is executed, the corresponding runtime instrumentation will transmit authentication credentials to authenticate the serverless function 105 with the SAB 113. The authentication credentials can include function identifier/name, application signature, etc. to identify the serverless function 105. The authentication request will also indicate information that identifies the executing instance of the serverless function 105. In this case, the executing instance identifying information is at information that identifies underlying infrastructure supporting the deployed serverless application 103B (e.g., network address, range of network addresses). The underlying infrastructure identifying information can vary by cloud service provider. These operations will also be performed when the serverless function 107 is invoked. After successful authentication, the runtime instrumentation of the serverless function 105 requests a tailored role with least privilege(s) for the executing instance of the serverless function 105. The runtime instrumentation can retransmit function identifying information to the SAB 113 or the SAB 113 can cache this information from authentication for use when the role request is received. In some embodiments, the authentication request can be processed as an authentication request and implicit tailored role request by the SAB 113. Upon determining successful authentication, the SAB 113 can initiate privilege determination without awaiting an explicit request.

At stage D, the SAB 113 accesses the database 109 to determine least privilege(s) for the invoked function 105. The database 109 is organized to associate each serverless function of a serverless application with one or more privileges deemed necessary for proper execution of the associated function. The association can be between a function identifier (e.g., concatenation of application identifier and function identifier or hash of concatenation of application identifier and function identifier) and indications of privileges (e.g., READ DB1; WRITE DB2; PERMIT API XX2).

After obtaining the least privilege(s) from the database 109, the SAB 113 interacts with a service 133 of the cloud service provider to create a role with the determined least privilege(s) at stage E. The SAB 113 provides the least privilege(s) (e.g., as arguments or parameters) to the service 133 for role creation. The service 133 returns to the SAB 113 a role identifier to the SAB 113. Since the SAB 113 may be brokering role creation for multiple applications, the SAB 113 may organize created roles by application and even cloud service provider, as well as function.

At stage F, the SAB 113 communicates the created role for the invoked function 105 to the serverless application 103B. The corresponding runtime instrumentation assigns the communicated role to the function 105 and then executes the serverless function 105 with that role.

At stage G, the SAB maintains the on-the-fly tailored roles per function instance. As part of the security mechanism, the created roles expire. The SAB 113 sets an expiration period based on execution time of the function and/or execution times of functions (e.g., greatest execution time) of the serverless application 103B. Upon expiration, the SAB 113 interacts with the service 133 to terminate or delete the expired role.

While the name security access broker is used for consistency with the earlier description, programs/module can be given a variety of names while having substantially similar functionality. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. A "security access broker" is a program(s) that runs external to one or more serverless applications and can run within or external to a corresponding cloud service provider. The program or program(s) operate as an intermediary between the serverless application and a role creation service/function of the cloud service provider that supports the serverless application. An access broker can be implemented as a service or standalone application.

Figure 2:
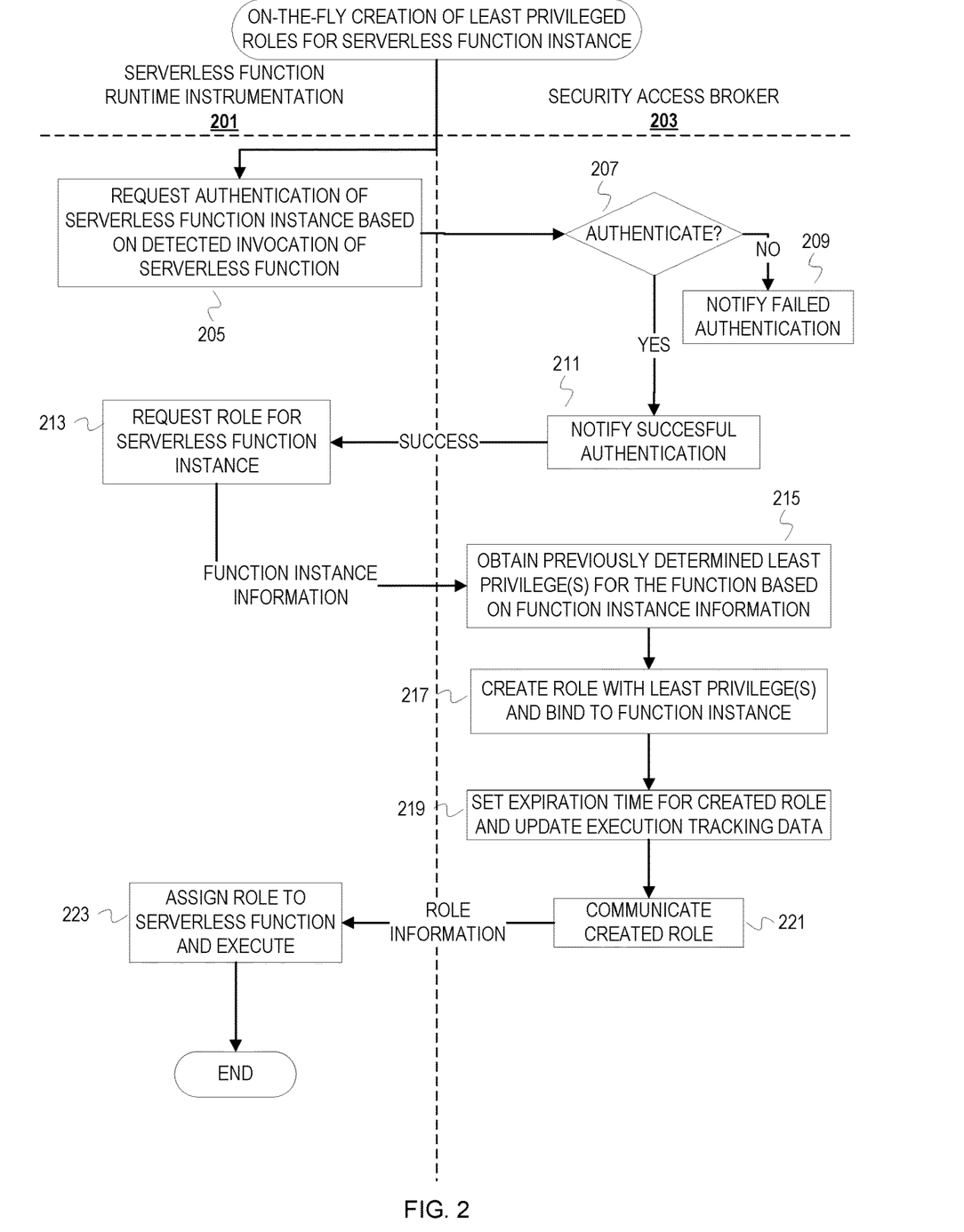
FIG. 2 is a flowchart of example operations for a serverless function runtime instrumentation and a security access broker interacting for on-the-fly creation of least privileged roles for a serverless function instance.

FIG. 2 is a flowchart of example operations for a serverless function runtime instrumentation and a security access broker interacting for on-the-fly creation of least privileged roles for a serverless function instance. When a serverless function instrumented for security purposes is invoked, the runtime instrumentation (e.g., a runtime protection module) communicates with the security access broker to obtain a role tailored to least privilege(s) necessary for the serverless function to execute properly.

At block 205, serverless function runtime instrumentation 201 requests authentication of a corresponding serverless function instance based on detected invocation of the serverless function. As instrumented, the runtime instrumentation 201 will execute prior to the program code of the serverless function. The runtime instrumentation 201 will have access to credentials for authenticating the serverless function. The runtime instrumentation 201 may include program code to query an underlying infrastructure or operating system for host information (e.g., a network address assigned to a host of the serverless application that includes the serverless function.

At block 207, a security access broker 203 authenticates the serverless function instance. The security access broker 203 can invoke or communicate with another program or module responsible for authentication. If the authentication is successful, then program flow continues to block 211. Otherwise, program flow continues to block 209.

At block 209, the security access broker 203 generates a notification of the failed authentication. This notification can be logged, communicated to the serverless application instance encapsulating the runtime instrumentation 201, communicated to the runtime instrumentation 201, etc.

At block 211, the security access broker 203 notifies the runtime instrumentation 201 of the successful authentication. Based on the successful authentication, the security access broker 203 may populate a data structure that tracks successfully authenticated serverless functions that are active. For example, the security access broker 203 can maintain a data structure with an entry for each successfully authenticated serverless function that will be used for regulating the life of the role to be created and assigned (i.e., used for managing role expiration). The security access broker 203 can then mark entries as expired and/or delete the entries corresponding to serverless functions assigned expired roles.

At block 213, the serverless function runtime instrumentation 201 requests a role for the serverless function instance. As part of the request, the runtime instrumentation 201 communicates to the security access broker 203 information identifying the serverless function instance. Examples of the identifying information include a function identifier; an application identifier; a combination of a function identifier and an application identifier; a combination of a function identifier, an application identifier, and a value identifying cloud infrastructure supporting the serverless application.

At block 215, the security access broker 203 obtains previously determined least privilege(s) for the serverless function based on the communicated function instance information. The security access broker accesses a database that indicates previously identified serverless functions of the serverless application and the previously determined least privilege(s) of each function. The information may have been determined with static analysis from code scanning, knowledge/documentation for the serverless application, and/or behavioral analysis of prior (laboratory or live) executions of the serverless application.

At block 217, the security access broker 203 creates a least privileged role based on the obtained least privilege(s) for the serverless function, and binds the created role to the instance of the serverless function. To create the role, the security access broker 203 interacts with a service, command interface, or application programming interface of a cloud service corresponding the cloud infrastructure that supports the serverless application. The security access broker 203 communicates indications of the obtained least privilege(s) to the cloud service for creation of the role. An indication of the created role (e.g., role identifier) is returned to the security access broker 203. The security access broker 203 binds the role to the information that identifies the serverless function instance (e.g., the network address of a cloud server hosting the serverless application). "Binding" the role to the serverless function instance can be updating the previously mentioned data structure entry for the serverless function instance with the role identifier.

At block 219, the security access broker 203 sets an expiration time for the created role and updates execution tracking data. For example, the security access broker 203 updates the aforementioned data structure (hereinafter "transient role structure") with an expiration time (e.g., 3 minutes). The security access broker 203 can be programmed to set expiration based on expected execution time of the serverless function instance and additional time accounting for communication of the role to the runtime instrumentation 201. The security access broker also updates the transient role structure to indicate a timestamp of first execution of the serverless function instance and/or increments an execution counter for the serverless function instance.

At block 221, the security access broker 203 communicate the created role to the runtime instrumentation 201. For example, the security access broker 203 indicates the created role identifier in the message to the runtime instrumentation 201.

At block 223, the runtime instrumentation 201 assigns the role communicated from the security access broker 203 to the serverless function and executes the serverless function. The runtime instrumentation 201 can modify code to set the created least privileged role to override the default role for the serverless function. The runtime instrumentation 201 may execute the serverless function with the least privileged role identifier as an argument or parameter in the invocation.

Despite static analysis and past behavior analysis of a serverless application providing intelligence for creation of a least privileged role tailored for each serverless function of the serverless application, execution behavior can change and analysis may not be perfect. Changing execution behavior and/or imprecise analysis can lead to under-permissive privileges or over-permissive privileges over time/executions. To minimize the impact of imperfect analysis and adapt to execution behavior over time/executions, the security access broker is programmed to adjust accordingly. The flowcharts depicted in FIGS. 3 and 4 correspond to these different adjustments.

Figure 3:
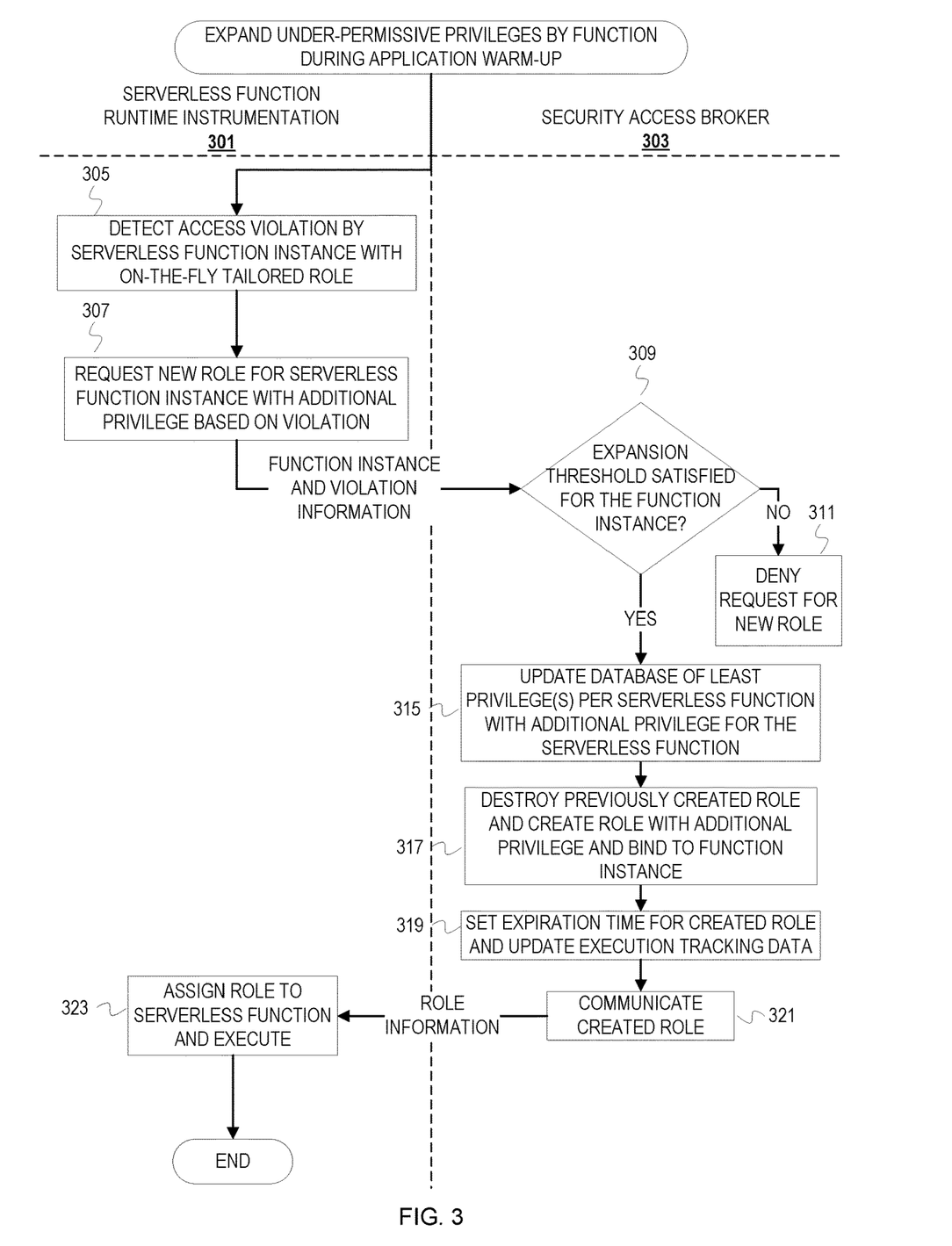
FIG. 3 is a flowchart of example operations for expanding under-permissive privileges by serverless function during application warm-up.

FIG. 3 is a flowchart of example operations for expanding under-permissive privileges by serverless function during application warm-up. Since the likelihood of an attack during a warm-up period (first n executions or t hours), the security access broker will expand privilege of a serverless function based on an access violation (e.g., identity and access management violation) during this warm-up period. This avoids false positives from causing a business disruption.

At block 305, serverless function runtime instrumentation 301 detects an access violation by a serverless function instance with an on-the-fly tailored role. It is assumed at this point in the flow that the serverless function instance has already been assigned a least privileged role from the security access broker. For example, the serverless function instance may have attempted to write to a database X while the least privileged role only specified write permission to a database Y. Or the serverless function instance may have attempted to write to a database X with a least privileged role that only provides read permission to the database X. The runtime instrumentation 301 can detect the access violation differently. For instance, the runtime instrumentation 301 may receive a message indicating an IAM violation based on failed execution of the serverless function instance.

At block 307, the runtime instrumentation 301 requests a new role for the serverless function instance with an additional privilege based on the access violation. The request may include a flag or argument that distinguishes the request as a request for expanding privilege or a role. The request includes information that identifies the serverless function instance (e.g., function identifier and network address of cloud server) and indicates the access violation. The request can be a beacon request (i.e., a request message that complies with the Beacon interface specification).

At block 309, the security access broker 303 determines whether the expansion criterion has been satisfied for the serverless function instance. The security access broker 303 accesses the transient role structure to read the entry for the serverless function instance indicated by the runtime instrumentation 301. If the expansion criterion is defined by time, the security access broker 303 reads a timestamp from the entry that indicates when the serverless function instance was first invoked. The security access broker 303 would then determine whether the time-based expansion criterion has lapsed since the initial invocation of the serverless function instance. If the expansion criterion is defined by numbers of executions, the security access broker 303 reads an execution counter from the appropriate transient role structure entry.

If the expansion criterion is not satisfied, then the security access broker denies the request for the new expanded role at block 311. For example, the security access broker 303 would not fulfill the request if the execution counter for the serverless function instance indicates 120 executions and the expansion criterion is that executions should be equal to or less than 100. As another example, the security access broker 303 would not fulfill the request if the initial execution timestamp for the serverless function instance indicates 13:42:05.12 20200126, the current invocation has a timestamp of 03:07:26.09 20200127 and the expansion criterion is 12 hours or less.

If the expansion criterion is satisfied, then the security access broker 303 updates a database of least privilege(s) per serverless function with an additional privilege for the serverless function at block 315. The security access broker 303 accesses the database and inserts or adds indication of the privilege that would overcome the access violation.

At block 317, the security access broker destroys or deletes the previously created role (if not already expired) and creates a new least privileged role with the additional privilege. If the under-permissive role has not yet expired, the security access broker communicates with the cloud service to destroy the role and create the new expanded role. The security access broker 303 then updates the transient role structure entry corresponding to the serverless function instance to bind the new expanded role to the serverless function instance.

At block 319, the security access broker 303 sets the expiration time for the created role and updates the execution tracking data. For example, the security access broker 303 updates the transient role structure with an expiration time for the newly expanded role based on when the new role is created or communicated. If an execution counter is being used, then the security access broker 303 also updates the transient role structure by incrementing the execution counter.

At block 321, the security access broker 303 communicates the created expanded role to the runtime instrumentation 301. For example, the security access broker 303 indicates the created role identifier in the message to the runtime instrumentation 301.

At block 323, the runtime instrumentation 301 assigns the role communicated from the security access broker 303 to the serverless function instance and re-executes the serverless function. The runtime instrumentation 301 can modify code to set the created expanded, least privileged role in place of the under-permissive role that has been eliminated. The runtime instrumentation 301 may execute the serverless function with the expanded least privileged role identifier as an argument or parameter in the invocation.

Figure 4:
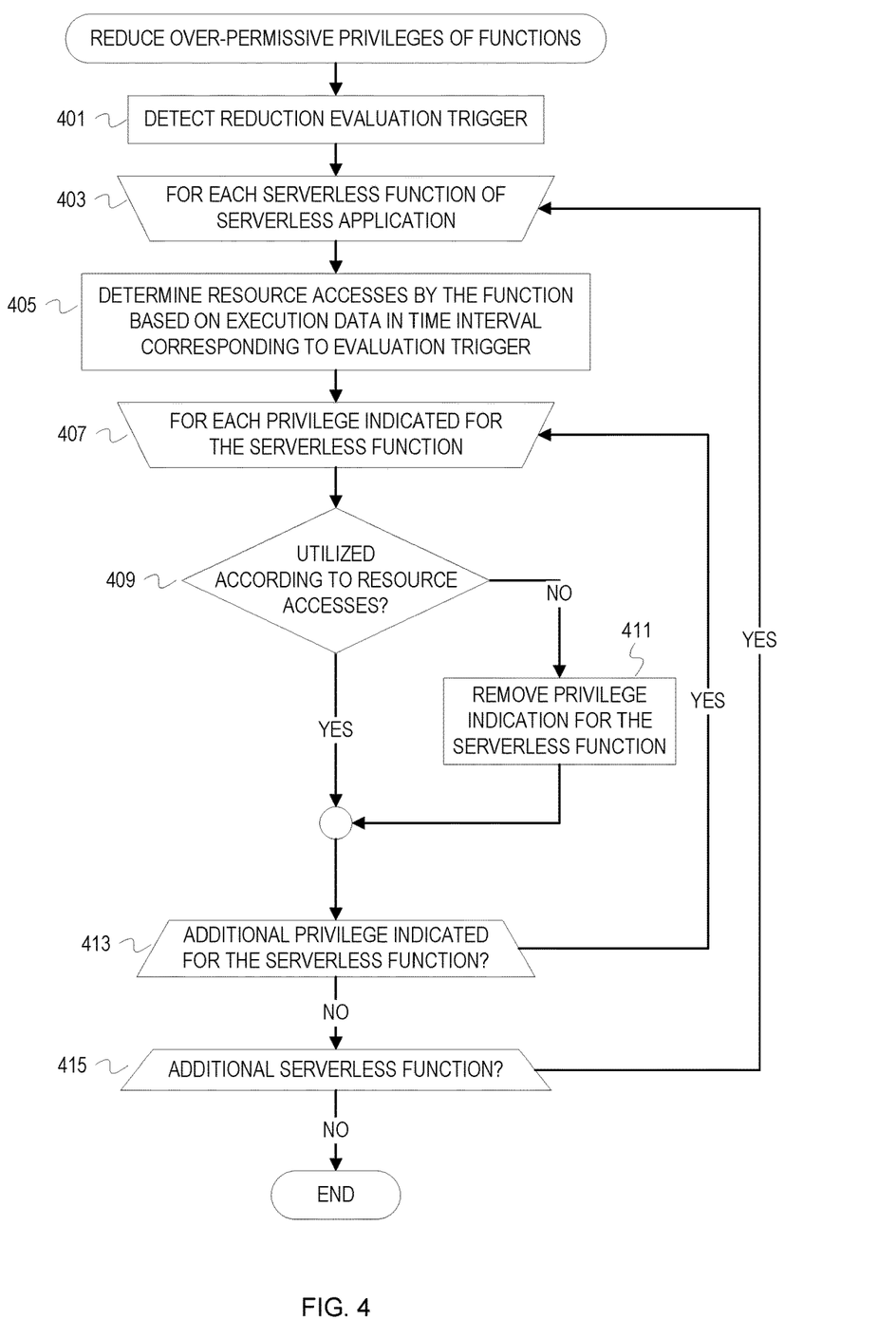
FIG. 4 is a flowchart of example operations for reducing over-permissive privileges of serverless functions of a serverless application.

FIG. 4 is a flowchart of example operations for reducing over-permissive privileges of serverless functions of a serverless application. The description refers to a security access broker as performing the example operations for consistency. Instead of an access violation triggering a privilege adjustment to expand a role, periodic evaluations can be performed to detect over-permissive privileges.

At block 401, a security access broker detects a reduction evaluation trigger. The reduction evaluation trigger can be defined differently depending upon administrator preference, developer preference, cloud infrastructure constraints, or application knowledge, as examples. For instance, the reduction evaluation trigger can be periodic (e.g., every week) and/or event driven (e.g., manual command or detection of analysis results). Reduction evaluation is depending upon availability of new information. The new information can be from continuous or repeated static analysis of the serverless application code. The new information can also or instead be from analysis of an execution log(s) of the serverless application and/or cloud infrastructure supporting the serverless application.

At block 403, the security access broker begins evaluating privilege(s) of each serverless function. The evaluations involve comparing indicated least privilege(s) for a serverless function with resource accesses by the serverless function from historical executions of the serverless function instance.

At block 405, the security access broker determines resource accesses by the serverless function based on execution data in a time interval corresponding to the evaluation trigger. A time interval corresponding to the evaluation trigger may be a preceding week or quarter, or be a specific historical time period (e.g., time of a specific application event such as peak usage or a business event). The security access broker determines resources accessed by the serverless function and types of access in the time interval(s). The security access broker may organize the determines resource accesses to facilitate efficient searching and examination.

At block 407, the security access broker begins comparison of each privilege indicated for the serverless function against the determined resource accesses. The description refers to a privilege being compared in a current iteration as the "selected" privilege.

At block 409, the security access broker determines whether the serverless function utilized the selected privilege according to the determined resource accesses. The security access broker can search the resource accesses for the selected privilege. If the selected privilege was not used, then program flow continues to block 411. If the selected privilege was used by the serverless function, then program flow continues to block 413.

At block 411, the security access broker removes the selected privilege indication for the serverless function. The security access broker updates the database entry for the serverless function to remove the unused privilege. Program flow continues from block 411 to block 413.

At block 413, the security access broker determines whether there is another privilege indicated for the serverless function to evaluate. If so, program flow returns to block 407 for the security access broker to select the next privilege for evaluation. If there is not another privilege indicated, then program flow continues to block 415. At block 415, the security access broker determines whether there is another serverless function of the serverless application evaluate. If so, program flow returns to block 403 for the security access broker to select the next serverless function for evaluation. If there is not another serverless function, then program flow ends.

Variations

Embodiments of the technology are not constrained to the specific examples described herein. For example, an embodiment can expand under-permissive roles based on detection of an access violation by the security access broker instead of runtime instrumentation of a serverless function. The security access broker may have a helper thread or background process that monitors execution logs of a serverless application and/or logs of the cloud infrastructure to determine access violations by a serverless function instance. When the security access broker detects a violation in the logs, then the security access broker can update the database of least privileges accordingly. Embodiments can also employ both techniques for detecting access violations and adjusting privileges accordingly.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
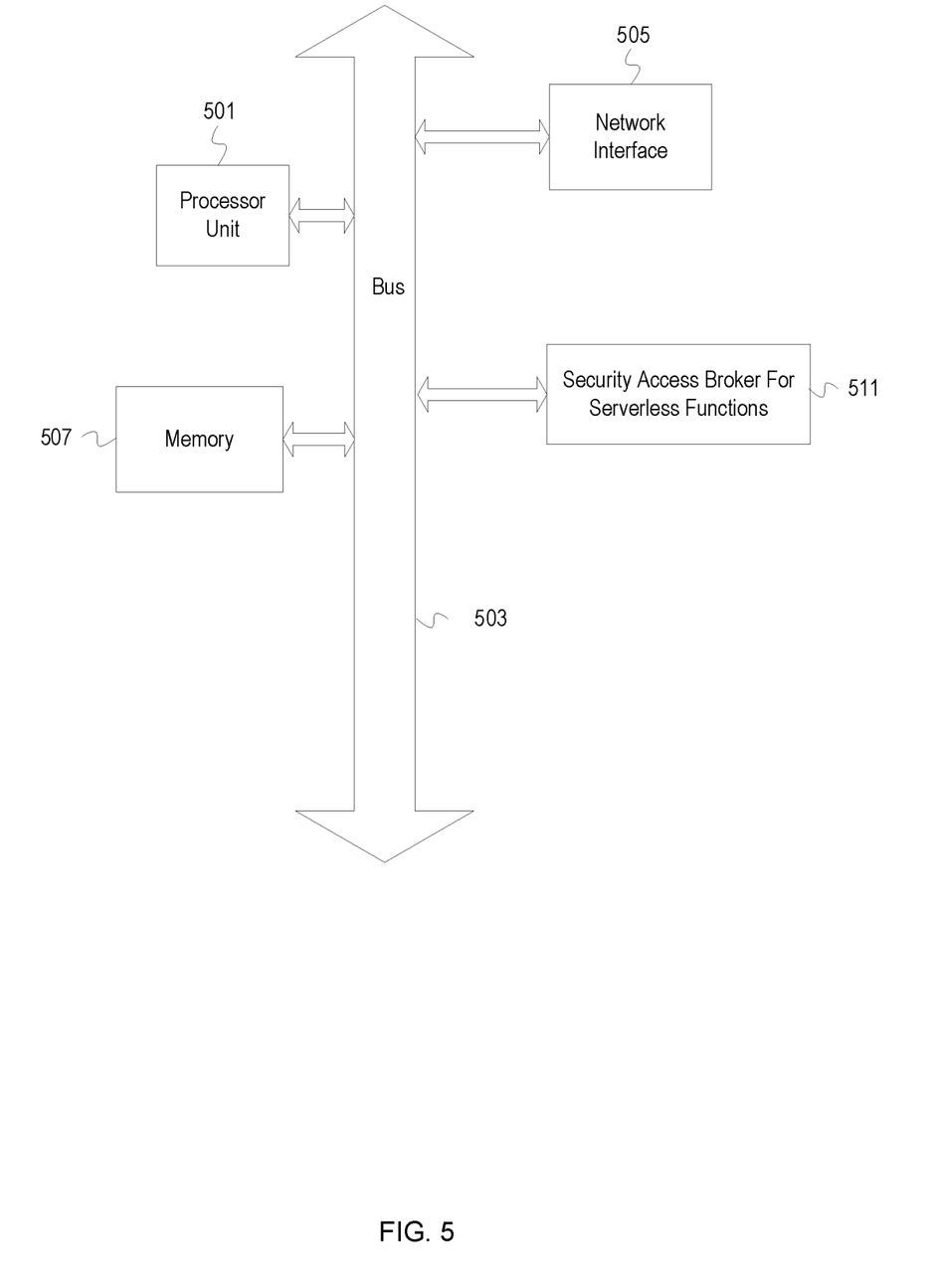
FIG. 5 depicts an example computer system with a security access broker to create transient least privileged roles on-the-fly for serverless functions.

FIG. 5 depicts an example computer system with a security access broker to create transient least privileged roles on-the-fly for serverless functions. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a security access broker 511 for serverless functions. The security access broker 511 creates transient, least privileged roles for serverless functions on-the-fly. With this capability, a serverless application can be developed with less burden on developers since serverless functions can be assigned a default role that limits functionality to communicating with the security access broker to obtain a least privileged role. This effectively automates role management to efficiently limit the potential for abuse of over-permissive roles and correct for under-permissive roles. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. In more general terms, a cloud service provider resource accessible to serverless function is a resource owned/manage by the cloud service provider entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:
1. A method comprising:
based on invocation of a first serverless function of a serverless application instantiated on a cloud infrastructure, runtime instrumentation of the first serverless function submitting a role request to an intermediary, wherein the runtime instrumentation submits the role request according to a default role defined for a plurality of instrumented serverless functions of the serverless application, wherein the default role limits the plurality of instrumented serverless functions to communicating with the intermediary;
the intermediary reading a set of one or more least privileges for the first serverless function, wherein the set of one or more least privileges were previously determined from analysis of program code of the serverless application;
the intermediary communicating with a service associated with the cloud infrastructure to create a first role with the set of one or more least privileges;
the intermediary maintaining information to enforce expiration of the first role; and
the intermediary returning indication of the first role to the runtime instrumentation for assignment to the first serverless function instantiated on the cloud infrastructure.

2. The method of claim 1 further comprising the runtime instrumentation executing the first serverless function instance with the assigned first role.

3. The method of claim 1 further comprising the intermediary expiring the first role based on determining that an expiration criterion is satisfied.

4. The method of claim 1 further comprising determining least privileges for serverless functions of the serverless application based on at least one of static code analysis and behavior analysis of the serverless application prior to deployment of the serverless application to the cloud infrastructure.

5. The method of claim 1 further comprising:
based on detection of an access violation by the first serverless function instance,
determining whether the first serverless function instance satisfies an expansion criterion;
indicating an additional privilege for the first serverless function based on the access violation; and
creating a second role for the first serverless function with the set of one or more least privileges and the additional privilege.

6. The method of claim 5, wherein determining whether the first serverless function instance satisfies an expansion criterion comprises determining whether the first serverless function instance is executing outside of a warm-up period.

7. The method of claim 1 further comprising:
based on detection of an evaluation trigger,
for each of a plurality of serverless functions of the serverless application
including the first serverless function,
determining resources accessed by the serverless function instantiated on the cloud infrastructure;
determining whether one or more of a set of privileges indicated as least privileges for the serverless function was not used based on the resources accessed; and
removing an unused privilege indicated as a least privilege for the serverless function.

8. The method of claim 1, wherein the runtime instrumentation submits the role request after authenticating the first serverless function instance with the intermediary.

9. The method of claim 8, wherein the intermediary maintaining information to enforce expiration of the first role comprises binding the first role to authentication information of the first serverless function instance.

10. A non-transitory, machine-readable medium having program code stored thereon, the program code to:
based on receipt of a role creation request for an instance of a first serverless function of a serverless application, determine whether the first serverless function instance successfully authenticates and to read a set of privileges indicated for the first serverless function after successful authentication, wherein the set of privileges was previously determined from analysis of the program code of the serverless application;
communicate with a service associated with a cloud infrastructure to create a first role with the set of privileges, wherein the instance of the first serverless function is deployed on the cloud infrastructure;
maintain information to enforce expiration of the first role, wherein the program code to maintain information to enforce expiration of the first role comprises program code to bind the first serverless function instance to authentication information of the first serverless function instance; and
communicate the first role to the instance of the first serverless function for runtime instrumentation of the first serverless function instance to execute the first serverless function instance with the first role.

11. The machine-readable medium of claim 10, wherein the program code further comprises program code to expire the first role based on evaluation of the expiration information for the first serverless function instance and an expiration criterion defined for serverless functions of the serverless application.

12. The machine-readable medium of claim 10, wherein the program code further comprises program code to modify privileges indicated as least privileges for serverless functions based on a determination of an under-permissive role or an over-permissive role.

13. The machine-readable medium of claim 12, wherein the program code to modify privileges indicated as least privileges for serverless functions based on a determination of an under-permissive role or an over-permissive role comprises program code to indicate an additional privilege for a serverless function of the serverless application based on detection of an access violation by an instance of the serverless function.

14. The machine-readable medium of claim 12, wherein the program code to modify privileges indicated as least privileges for serverless functions based on a determination of an under-permissive role or an over-permissive role comprises program code to remove a privilege for a serverless function of the serverless application based on a determination that the serverless function did not use an indicated privilege.

15. An apparatus comprising:
a processor; and
a computer-readable medium having instructions stored thereon that are executable by the processor to cause the apparatus to,
based on receipt of a role creation request for an instance of a first serverless function of a serverless application, determine whether the first serverless function instance successfully authenticates and to read a set of privileges indicated for the first serverless function after successful authentication, wherein the set of privileges was previously determined from analysis of the program code of the serverless application;
communicate with a service associated with a cloud infrastructure to create a first role with the set of privileges, wherein the instance of the first serverless function is deployed on the cloud infrastructure;
maintain information to enforce expiration of the first role, wherein the instructions to maintain information to enforce expiration of the first role comprise instructions to bind the first serverless function instance to authentication information of the first serverless function instance; and
communicate the first role to the instance of the first serverless function for runtime instrumentation of the first serverless function instance to execute the first serverless function instance with the first role.

16. The apparatus of claim 15, wherein the computer-readable medium further comprises instructions executable by the processor to cause the apparatus to expire the first role based on evaluation of the expiration information for the first serverless function instance and an expiration criterion defined for serverless functions of the serverless application.

17. The apparatus of claim 15, wherein the computer-readable medium further comprises instructions executable by the processor to cause the apparatus to modify privileges indicated as least privileges for serverless functions based on a determination of an under-permissive role or an over-permissive role.

\* \* \* \* \*